Figure 1:
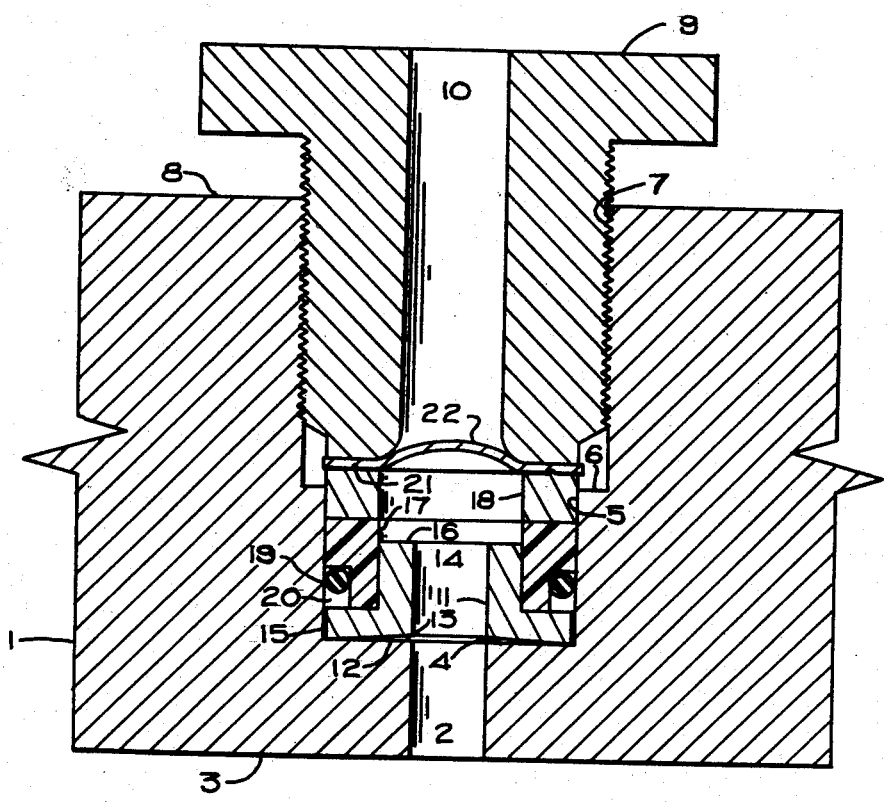

Feb. 9, 1960

F. A. HANSEN 2,924,354

SAFETY PRESSURE RELIEF DEVICE

Filed Jan. 15, 1958

FRANKLIN A. HANSEN
*INVENTOR.*

BY

*ATTORNEY*

United States Patent Office 2,924,354
Patented Feb. 9, 1960

2,924,354

SAFETY PRESSURE RELIEF DEVICE

Franklin A. Hansen, Kansas City, Mo., assignor to Black, Sivalls & Bryson, Inc., Kansas City, Mo., a corporation of Delaware Application January 15, 1958, Serial No. 709,135

5 Claims. (Cl. 220—89)

The present invention relates generally to safety pressure relief devices and more specifically to at frangible safety pressure relief device for relief of extremely high pressures from a pressure system.

The general trend of present day industries, e.g., the chemical industry, indicates that more processes are presently in use which utilize extremely high pressures. These high pressures presently range from thirty thousand pounds per square inch to above one hundred thousand pounds per square inch. At such extremely high process pressures the need for a safety pressure relief device to protect against pressures above the design strength of the apparatus in which the process operates is greater than in systems operating under lower pressures. The force and destructive power of an uncontrolled rupture of apparatus containing extremely high pressures are proportionately greater than in the lower normal pressure ranges.

In attempting to provide an adequate safety pressure relief device for a system containing such extremely high pressures, I have investigated many types of pressure relieving equipment which are presently available. All of the available types of equipment investigated were found to be unsatisfactory. For example, spring-loaded poppet valves have the disadvantages of not providing complete pressure relief and of being extremely expensive and cumbersome if designed for such high pressures. Prior rupturable safety pressure relief devices fail to operate in these high pressure ranges since from a practical standpoint it is impossible to retain the rupturable diaphragm in its seat without damaging it, without having pressure leakage or without materially changing its predetermined rupture pressure. It was found that by tightening such a device sufficiently for it to remain seated would often cause the frangible diaphragm to be weakened materially at the line of retention. If such initial loading were not applied, leakage would occur or the frangible diaphragm would be pulled inwardly so that additional material would be in the pressure relief area thereby changing the ultimate pressure at which the device would rupture to allow pressure relief. In a safety device of this type, such disadvantages as those previously mentioned would each in itself be sufficient to eliminate the device from consideration for use in systems operating at such pressure extremes.

Therefore, the primary object of the present invention is to provide a rupturable type safety pressure relief device suitable for use at extremely high pressures. A further object of the present invention is to provide a high pressure safety pressure relief device which utilizes the system pressure that is to be contained to maintain its pressure seal. A still further object of the present invention is to provide a rupturable type safety pressure relief device for extremely high pressures whose rupture pressure can be accurately predetermined. Another object of the present invention is to provide a high pressure safety pressure relief device in which the initial sealing load need only be sufficient to provide proper seating and sealing of the device under moderate pressures. Still another object of the present invention is to provide a pressure energized sealing and seating force for a rupturable type safety pressure relief device.

In accomplishing these and other objects of the present invention, I have provided improved details of structure as illustrated in the accompanying drawing wherein the figure is a detailed sectional view of a preferred form of the present invention.

Referring more in detail to the drawing:

A portion of the shell of the apparatus in which the safety pressure relief device of the present invention is to be installed is designated by the numeral 1. It should be understood that the present invention can be installed in a separate base member having the same internal contour as shell 1 and be threaded or otherwise suitably formed for securing it to the apparatus to be protected. Such a modification is contemplated and should not be considered a departure from the present invention.

Shell 1 has a relief passageway 2 extending from its interior side 3 and terminating in a shoulder 4. A bore 5 extends from shoulder 4 to a second shoulder 6. Bore 7 is internally threaded as shown and extends from shoulder 6 to the exterior side 8 of shell 1.

Holddown member 9 is threaded to fit into threaded bore 7 of shell 1. Relief opening 10 extends axially through holddown member 9 to provide communication from relief passageway 2 to the exterior of shell 1.

Base ring 11 is positioned in bore 5 so that it rests on shoulder 4. As shown, the lower surface 12 of base ring 11 is formed to allow a pressure space 13 between surface 12 and shoulder 4. Bore 14 extends axially through base ring 11. Base ring 11 is composed of flange 15 and hub 16. Piston 17 is positioned in the space above flange 15 of base ring 11 and between hub 16 and bore 5 of shell 1. As shown in the figure piston 17 extends above the upper end of hub 16 and engages support ring 18. O-ring 19 is positioned in groove 20 in piston 17. Support ring 18 is annular in shape having an outer diameter conforming substantially to the diameter of bore 5. Knife edge 21 is formed on the upper surface of support ring 18. Rupturable diaphragm 22 is positioned between the upper surface of support ring 18 and the end of holddown member 9 thereby blocking the end of relief opening 10 in holddown member 9.

In operation the parts of the present invention are assembled as shown in the figure. Holddown member 9 is tightened sufficient only to provide an initial pressure seal for the device. For example, in a one-quarter inch diameter unit having a rupture pressure rating of one hundred thousand pounds per square inch wherein the holddown member has a one inch threaded section with an engagement length of approximately one inch, a torque of fifty foot pounds is sufficient to accomplish adequate initial sealing.

It has been found desirable to fabricate piston 17 from a material having substantially more resilience than steel, for example, nylon or Teflon. Such resilience has been found to be desirable since slight surface irregularities will not prevent complete sealing at operating pressures and further if piston 17 were made from a material such as mild steel, it would be permanently deformed after being exposed to operating pressures and thereafter would be difficult to remove from bore 5. Base ring 11 can be threaded on its interior bore to facilitate its removal from bore 5.

Rupturable diaphragm 22 should be of sufficient thickness and strength to obtain the proper predetermined rupture pressure. The material of diaphragm 22 should be selected to obtain the desired strength and to be impervious to any corrosive conditions under which it is to operate.

When the device of the present invention has been properly installed and initial sealing obtained by tightening holddown member 9 as previously explained, the device will be ready to withstand operating pressures and to protect the system to which it is connected from pressures above a predetermined relieving pressure.

Initial seals are obtained at the point of contact of O-ring 19 and bore 5 and at the point of contact of knife edge 21 on support ring 18 and rupturable diaphragm 22. Also, because of the initial loading and the resiliency of piston 17, a seal is obtained on the contacting surfaces of piston 17 and support ring 18. As the operating pressures increase, the pressure on surface 12 will cause the whole assembly, base ring 11, piston 17 and support ring 18, to be forced in the direction of holddown member 9. This force will add to the sealing between support ring 18 and rupturable diaphragm 22. Further, the increase in pressure will act on the inner bore of piston 17, forcing piston 17 against bore 5 and preventing the extruding of O-ring 19 between piston 17 and bore 5, allowing the use of O-rings for pressures substantially above their normal allowable working pressures.

Also, the force from the pressure under surface 12 of base ring 11 will effect a seal on the contact surfaces of support ring 18 and rupturable diaphragm 22.

Knife edge 21 functions to form initial seal with moderate torque loading and to prevent slippage of rupturable diaphragm 22 into relief opening 10. Such a slippage, radially inward, would place more material of diaphragm 22 in relief opening 10 and therefore increase the rupture pressure of the unit. Knife edge 21 will operate satisfactorily having a height of fifteen thousandths of an inch and a diameter approximately one-half the sum of the inner and outer diameters of support ring 18 when used with a rupturable diaphragm 22 which is rated at one hundred thousand pounds per square inch and a relief area approximately one-fourth of an inch in diameter.

Thus, it may be seen that by my present invention I have provided an accurate rupturable safety pressure relief device for relieving extremely high pressures. Further, my present device is loaded initially sufficient only to provide an initial sealing and operating sealing is obtained by utilization of the operating pressures. Still further, my present invention provides for the positive retention of the rupturable diaphragm at all operating pressures by the prevention of radial slippage of the diaphragm. Also, my present invention provides a pressure energized seal when exposed to operating pressures for the rupturable diaphragm on its seat and between the piston and the bore in which the piston is installed.

What I claim and desired to secure by Letters Patent is:

1. A safety pressure relief device comprising, a body member, a relief passageway through said body member, a rupturable diaphragm positioned across said relief passageway, a holddown member engaging said diaphragm and said body member to hold said diaphragm in position across said relief passageway and a pressure actuated piston assembly providing a seat for said diaphragm in said relief passageway, said pressure actuated piston assembly being annular in shape to provide a pressure relief passageway therethrough connecting said relief passageway through said body member to expose said diaphragm to the pressure fluids, said holddown member having a pressure relief passageway extending therethrough to provide a relief area through which the pressure fluids may be conducted through the safety pressure relief device upon rupture of said rupturable diaphragm.

2. A safety pressure relief device attached to a pressure vessel to provide pressure relief for said pressure vessel comprising, a circular relief passageway extending through the wall of said pressure vessel, said relief passageway having an internal shoulder facing outwardly with respect to the interior of said pressure vessel, a rupturable diaphragm positioned in said relief passageway, said rupturable diaphragm having a central rupturable portion and an annular flange portion, a holddown member, said holddown member having a circular relief bore extending axially therethrough, pressure actuated sealing means positioned between said rupturable diaphragm and said shoulder to provide a pressure seal against the wall of said relief passageway at a position between said shoulder and said diaphragm and to provide a pressure seal between the annular flange portion of said diaphragm and said sealing means, and means for tightening said holddown member into said passageway to seat said diaphragm on said sealing means to provide an initial pressure seal of said device to retain the pressure fluid within said pressure vessel.

3. A safety pressure relief device in accordance with claim 2 wherein said pressure actuated sealing means comprises an annular base ring having a hub portion and a flange portion, the flange portion of said base ring being positioned on said shoulder of said relief passageway, an annular resilient piston positioned between said hub and the wall of said relief passageway, said resilient piston extending outwardly substantially further than said hub of said base ring, and an annular support ring positioned between said resilient piston and the flange portion of said diaphragm.

4. A safety pressure relief device in accordance with claim 3 wherein the surface of said support ring which is in contact with the flange of said diaphragm has a knife edge protrusion engaging the flange portion of said diaphragm at a position between the outer diameter of said diaphragm and the inner diameter of said annular support ring.

5. A safety pressure relief device in accordance with claim 3 wherein said piston has a recess in its outer surface and a resilient O-ring sealing member positioned in said recess to provide a seal between said piston and said relief passageway.

References Cited in the file of this patent
UNITED STATES PATENTS
2,589,144    Russell et al. _____ Mar. 11, 1952